United States Patent
Tamaru et al.

(10) Patent No.: US 11,870,209 B2
(45) Date of Patent: Jan. 9, 2024

(54) LASER SYSTEM AND ELECTRONIC DEVICE MANUFACTURING METHOD

(71) Applicant: Gigaphoton Inc., Tochigi (JP)

(72) Inventors: Yuki Tamaru, Oyama (JP); Taisuke Miura, Oyama (JP)

(73) Assignee: Gigaphoton Inc., Tochigi (JP)

(*) Notice: Subject to any disclaimer, the term of this patent is extended or adjusted under 35 U.S.C. 154(b) by 20 days.

(21) Appl. No.: 17/517,982

(22) Filed: Nov. 3, 2021

(65) Prior Publication Data

US 2022/0059988 A1  Feb. 24, 2022

Related U.S. Application Data

(63) Continuation of application No. PCT/JP2019/023064, filed on Jun. 11, 2019.

(51) Int. Cl.
*H01S 3/23* (2006.01)
*H01S 3/225* (2006.01)

(52) U.S. Cl.
CPC ........... *H01S 3/2325* (2013.01); *H01S 3/225* (2013.01)

(58) Field of Classification Search
CPC ........ H01S 3/2325; H01S 3/225; H01S 3/034; H01S 3/10084; H01S 2301/20; H01S 3/005; H01S 3/0804; H01S 3/2375; H01S 3/2251; H01S 3/2366; H01S 3/2333
See application file for complete search history.

(56) References Cited

U.S. PATENT DOCUMENTS

| | | | |
|---|---|---|---|
| 2007/0023691 A1 | 2/2007 | Morishige et al. | |
| 2012/0236894 A1 | 9/2012 | Onose et al. | |
| 2012/0250708 A1* | 10/2012 | Onose | H01S 3/0092 372/25 |
| 2012/0250709 A1 | 10/2012 | Watanabe et al. | |
| 2013/0279526 A1 | 10/2013 | Kakizaki et al. | |
| 2017/0149199 A1* | 5/2017 | Tei | H01S 3/225 |

(Continued)

FOREIGN PATENT DOCUMENTS

| | | |
|---|---|---|
| CN | 105514788 A | 4/2016 |
| CN | 110024239 A | 7/2019 |
| CN | 110679045 A | 1/2020 |
| JP | H02-098919 A | 4/1990 |
| JP | 2011-192849 A | 9/2011 |
| JP | 2012-168498 A | 9/2012 |
| JP | 2012-204819 A | 10/2012 |

(Continued)

OTHER PUBLICATIONS

International Search Report issued in PCT/JP2019/023064; dated Sep. 10, 2019.

(Continued)

*Primary Examiner* — Xinning(Tom) Niu
(74) *Attorney, Agent, or Firm* — Studebaker & Brackett PC

(57) ABSTRACT

A laser system includes a beam shaping unit, a random phase plate, and a collimating optical system in an optical path between a solid-state laser device and an excimer amplifier. When a traveling direction of a laser beam entering the excimer amplifier is a Z direction, a discharge direction of a pair of discharge electrodes is a V direction, a direction orthogonal to the V and Z directions is an H direction, a shaping direction of the beam shaping unit corresponding to the V direction is a first direction, a shaping direction of the beam shaping unit corresponding to the H direction is a second direction, an expansion rate in the first direction is E1, and an expansion rate in the second direction is E2, the beam shaping unit expands a beam section of the laser beam such that an expansion ratio defined by E2/E1 is lower than 1.

20 Claims, 11 Drawing Sheets

(56) References Cited

U.S. PATENT DOCUMENTS

| | | | |
|---|---|---|---|
| 2017/0338620 A1* | 11/2017 | Arakawa | H01S 3/038 |
| 2018/0109065 A1* | 4/2018 | Sasaki | H01S 3/0057 |
| 2018/0180487 A1 | 6/2018 | Bibby et al. | |
| 2019/0288472 A1* | 9/2019 | Onose | G02B 27/48 |
| 2020/0112137 A1 | 4/2020 | Arakawa et al. | |

FOREIGN PATENT DOCUMENTS

| | | | |
|---|---|---|---|
| WO | 2016/151827 A1 | 9/2016 | |
| WO | 2018/138819 A1 | 8/2018 | |
| WO | 2019/012642 A1 | 1/2019 | |

OTHER PUBLICATIONS

International Preliminary Report On Patentability and Written Opinion issued in PCT/JP2019/023064; dated Dec. 14, 2021.

Richard Sandstrom, Measurements of beam characteristics relevant to DUV Microlithography on a KrF Excimer Laser, Cymer Laser Technologies, SPIE vol. 1264 Optical/Laser Microlithography III (1990), pp. 505-519.

Slava Rokitski et al., Enabling High Volume Manufacturing of Double Patterning Immersion Lithography with the XLR 600ix ArF Light Source, Optical Microlithography XXII, Proc. of SPIE vol. 7274 72743O-8, 2009.

A Notice of Decision of Granting Patent Right mailed by China National Intellectual Property Administration dated Apr. 15, 2023, which corresponds to Chinese Patent Application No. 201980095994.0 and is related to U.S. Appl. No. 17/571,982; with English language translation.

An Office Action; "Notification of Reasons for Refusal," mailed by the Japanese Patent Office dated Jun. 23, 2023, which corresponds to Japanese Patent Application No. 2021-525438 and is related to U.S. Appl. No. 17/517,982; with English language translation.

* cited by examiner

→ H

LASER SYSTEM AND ELECTRONIC DEVICE MANUFACTURING METHOD

CROSS-REFERENCE TO RELATED APPLICATIONS

The present application is a continuation application of International Application No. PCT/JP2019/023064, filed on Jun. 11, 2019, the entire contents of which are hereby incorporated by reference.

BACKGROUND

1. Technical Field

The present disclosure relates to a laser system and an electronic device manufacturing method.

2. Related Art

Improvement in resolution of semiconductor exposure apparatuses (hereinafter simply referred to as "exposure apparatuses") has been desired due to miniaturization and high integration of semiconductor integrated circuits. For this purpose, exposure light sources that output light with shorter wavelengths have been developed. As the exposure light source, a gas laser apparatus is used in place of a conventional mercury lamp. As a gas laser apparatus for exposure, a KrF excimer laser apparatus that outputs ultraviolet light having a wavelength of 248 nm and an ArF excimer laser apparatus that outputs ultraviolet light having a wavelength of 193 nm are currently used.

As current exposure technology, immersion exposure is practically used in which a gap between a projection lens of an exposure apparatus and a wafer is filled with a liquid and a refractive index of the gap is changed to reduce an apparent wavelength of light from an exposure light source. When the immersion exposure is performed using the ArF excimer laser apparatus as the exposure light source, the wafer is irradiated with ultraviolet light having an equivalent wavelength of 134 nm. This technology is referred to as ArF immersion exposure (or ArF immersion lithography).

The KrF excimer laser apparatus and the ArF excimer laser apparatus have a large spectral line width of about 350 to 400 pm in natural oscillation. Thus, chromatic aberration of a laser beam (ultraviolet light), which is reduced and projected on a wafer by a projection lens of an exposure apparatus, occurs to reduce resolution. Then, a spectral line width (also referred to as a spectral width) of a laser beam output from the gas laser apparatus needs to be narrowed to the extent that the chromatic aberration can be ignored. For this purpose, a line narrowing module (LNM) having a line narrowing element is provided in a laser resonator of the gas laser apparatus to narrow the spectral width. The line narrowing element may be an etalon, a grating, or the like. A laser apparatus with such a narrowed spectral width is referred to as a line narrowing laser apparatus.

LIST OF DOCUMENTS

Patent Documents

Patent Document 1: Japanese Unexamined Patent Application Publication No. 2011-192849
Patent Document 2: US Published Patent Application No. 2013/0279526
Patent Document 3: US Published Patent Application No. 2017/0338620

Non-Patent Documents

Non-Patent Document 1: Richard Sandstrom, Measurements of beam characteristics relevant to DUV MICROLITHOGRAPHY on a KrF EXCIMER LASER, SPIE Vol. 1264 Optical/Laser Microlithography Ill (1990)
Non-Patent Document 2: Slava Rokitski; Vladimir Fleurov; Robert Bergstedt; HongYe; Robert Rafac; Robert Jacques; Fedor Trintchouk; Toshi Ishihara; Rajeskar Rao; Theodore Cacouris; Daniel Brown; William Partlo, Enabling High Volume Manufacturing of Double Patterning Immersion Lithography with the XLR 600ix ArF Light Source, Optical Microlithography XXII, edited by Harry J. Levinson, Mircea V. Dusa, Proc. of SPIE Vol. 7274, 727430

SUMMARY

A laser system according to one aspect of the present disclosure includes a solid-state laser device configured to output a laser beam; an excimer amplifier including a pair of discharge electrodes arranged to face each other with a discharge space therebetween, the laser beam passing through the discharge space, the excimer amplifier being configured to amplify the laser beam; a beam shaping unit arranged in an optical path between the solid-state laser device and the excimer amplifier, the beam shaping unit being configured to expand a beam section of the laser beam output from the solid-state laser device; a random phase plate arranged in an optical path between the beam shaping unit and the excimer amplifier; and a collimating optical system arranged in an optical path between the random phase plate and the excimer amplifier, when a traveling direction of the laser beam entering the excimer amplifier is a Z direction, a discharge direction of the discharge electrodes is a V direction, a direction orthogonal to the V direction and the Z direction is an H direction, a shaping direction of the beam shaping unit corresponding to the V direction in the beam section of the laser beam entering the excimer amplifier is a first direction, a shaping direction of the beam shaping unit corresponding to the H direction in the beam section is a second direction, an expansion rate in the first direction is E1, and an expansion rate in the second direction is E2, the beam shaping unit expanding the beam section of the laser beam such that an expansion ratio defined by E2/E1 is lower than 1.

An electronic device manufacturing method according to another aspect of the present disclosure includes generating an excimer laser beam with a laser system, the laser system including a solid-state laser device configured to output a laser beam, an excimer amplifier including a pair of discharge electrodes arranged to face each other with a discharge space therebetween, the laser beam passing through the discharge space, the excimer amplifier being configured to amplify the laser beam, a beam shaping unit arranged in an optical path between the solid-state laser device and the excimer amplifier, the beam shaping unit being configured to expand a beam section of the laser beam output from the solid-state laser device, a random phase plate arranged in an optical path between the beam shaping unit and the excimer amplifier, and a collimating optical system arranged in an optical path between the random phase plate and the excimer amplifier, when a traveling direction of the laser beam entering the excimer amplifier is a Z direction, a discharge direction of the discharge electrodes is a V direction, a direction orthogonal to the V direction and the Z direction is an H direction, a shaping direction of the beam shaping unit corresponding to the V direction in the beam section of the laser beam entering the excimer amplifier is a first direction, a shaping direction of the beam shaping unit corresponding to the H direction in the beam section is a second direction, an expansion rate in the first direction is E1, and an expansion rate in the second direction is E2, the beam shaping unit expanding the beam section of the laser beam such that an expansion ratio defined by E2/E1 is lower than 1; outputting the excimer laser beam to an exposure apparatus; and exposing a photosensitive substrate to the excimer laser beam within the exposure apparatus to manufacture an electronic device.

BRIEF DESCRIPTION OF THE DRAWINGS

With reference to the accompanying drawings, some embodiments of the present disclosure will be described below merely by way of example.

DESCRIPTION OF EMBODIMENTS

Figure 1:
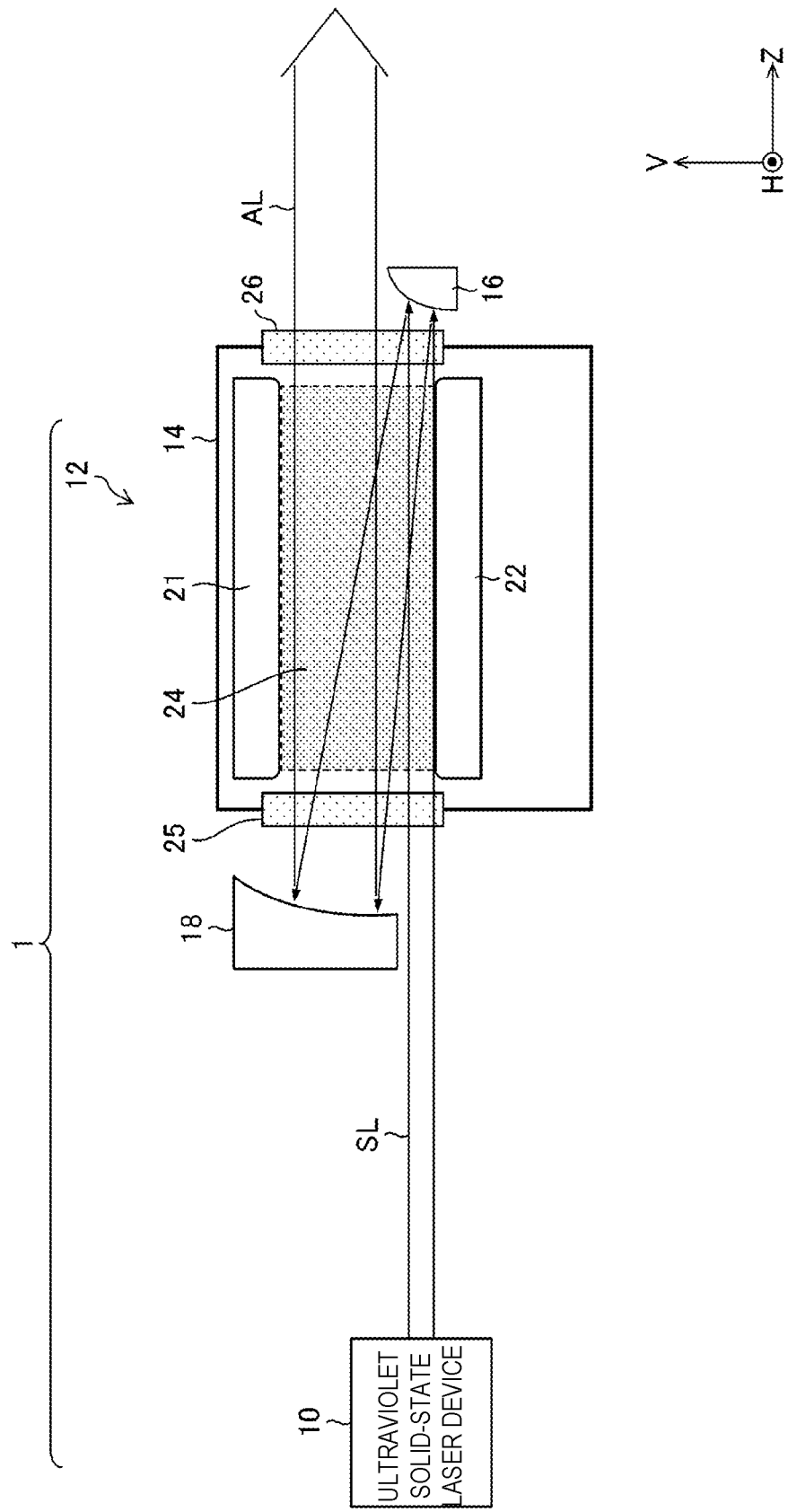
FIG. 1 schematically shows an exemplary configuration of a laser system.

<Contents>
1. Terms
2. Overview of laser system
   2.1 Configuration
   2.2 Operation
3. Problem
4. Embodiment 1
   4.1 Configuration
      4.1.1 Specific structure of beam shaping optical system
      4.1.2 Example of random phase plate
      4.1.3 Example of combination of pitch of random phase plate and focal lengths of convex lens, convex cylindrical mirror, and concave cylindrical mirror
   4.2 Operation
   4.3 Effect
5. Embodiment 2
   5.1 Configuration
   5.2 Operation
   5.3 Effect
6. Embodiment 3
   6.1 Configuration
      6.1.1 Example of combination of pitch of random phase plate and focal lengths of convex lens, first concave cylindrical mirror, and second concave cylindrical mirror
   6.2 Operation
   6.3 Effect
7. Embodiment 4
   7.1 Configuration
   7.2 Operation
   7.3 Effect
8. Embodiment 5
   8.1 Configuration
   8.2 Operation
   8.3 Effect
9. Electronic device manufacturing method
10. Others Now, with reference to the drawings, embodiments of the present disclosure will be described in detail. The embodiments described below illustrate some examples of the present disclosure, and do not limit contents of the present disclosure. Also, all configurations and operations described in the embodiments are not necessarily essential as configurations and operations of the present disclosure. The same components are denoted by the same reference numerals, and overlapping descriptions are omitted.

1. Terms

Terms used herein are defined as described below.

"Hybrid laser apparatus" refers to a two-stage laser apparatus including an oscillation stage (master oscillator) and an amplification stage (amplifier), the oscillation stage including a solid-state laser device and the amplification stage including an excimer laser apparatus. "Excimer amplifier" refers to an excimer laser apparatus used in the amplification stage.

A traveling direction of a laser beam is herein defined as "Z direction". One direction perpendicular to the Z direction is defined as "V direction", and a direction perpendicular to the V direction and the Z direction is defined as "H direction". For example, a traveling direction of the laser beam entering the excimer amplifier may be the Z direction, and a direction of a pair of discharge electrodes facing each other in the excimer amplifier, that is, a discharge direction may be the V direction.

The term "parallel" herein may include the concept of "substantially parallel" that may be considered to be substantially equivalent to "parallel" in technical significance. Also, the term "perpendicular" or "orthogonal" may include the concept of "substantially perpendicular" or "substantially orthogonal" that may be considered to be substantially equivalent to "perpendicular" or "orthogonal" in technical significance.

2. Overview of Laser System 2.1 Configuration

FIG. 1 schematically shows an exemplary configuration of a laser system 1. The laser system 1 is a hybrid laser apparatus including an ultraviolet solid-state laser device 10 and an excimer amplifier 12. The ultraviolet solid-state laser device 10 outputs, as seed light SL, an ultraviolet pulse laser beam having a wavelength of about 193.4 nm. The ultraviolet solid-state laser device 10 may include, for example, a semiconductor laser, a semiconductor amplifier, an optical fiber amplifier, and a wavelength conversion system using a nonlinear crystal.

The ultraviolet solid-state laser device 10 is arranged such that the seed light SL output from the solid-state laser device 10 and having the wavelength of about 193.4 nm enters the excimer amplifier 12. An optical element such as a highly reflective mirror (not shown) may be arranged in an optical path between the ultraviolet solid-state laser device 10 and the excimer amplifier 12.

The excimer amplifier 12 includes a chamber 14, a convex cylindrical mirror 16, and a concave cylindrical mirror 18. The chamber 14 contains, for example, an ArF laser gas containing an Ar gas as a noble gas, an $F_2$ gas as a halogen gas, and an Ne gas as a buffer gas.

A pair of discharge electrodes 21, 22 are arranged to face each other with a discharge space 24 therebetween in a V direction in the chamber 14. The V direction is parallel to a vertical direction of the plane of FIG. 1. The V direction corresponds to a discharge direction. A high voltage pulse power source (not shown) is arranged outside the chamber 14. The high voltage pulse power source is electrically connected to the discharge electrodes 21, 22 arranged in the chamber 14.

The chamber 14 includes windows 25, 26 that transmit a laser beam having a wavelength of about 193.4 nm. The window 25 is an entrance window through which the seed light SL output from the ultraviolet solid-state laser device 10 first enters the chamber 14. The window 26 is an exit window through which an amplified laser beam AL that is the amplified seed light SL is finally emitted from the chamber 14. The amplified laser beam AL is emitted through the window 26 in a Z direction perpendicular to the V direction. The Z direction is parallel to a transverse direction of the plane of FIG. 1.

The windows 25, 26 are tilted with respect to a discharge surface of the discharge electrodes 21, 22. The discharge surface is parallel to the plane of FIG. 1 (V-Z plane).

A convex reflective surface of the convex cylindrical mirror 16 and a concave reflective surface of the concave cylindrical mirror 18 are coated with highly reflective films that highly reflect the beam having the wavelength of about 193.4 nm. The convex cylindrical mirror 16 and the concave cylindrical mirror 18 are arranged to allow the seed light SL output from the ultraviolet solid-state laser device 10 and having the wavelength of 193.4 nm to pass three times through the discharge space 24. Thus, the seed light SL is expanded in the discharge direction and amplified in the discharge space 24.

2.2 Operation

The seed light SL output from the ultraviolet solid-state laser device 10 and having the wavelength of about 193.4 nm passes below a lower end of the concave cylindrical mirror 18, and enters the discharge space 24 while travelling parallel to longitudinal axes of the discharge electrodes 21, 22. The longitudinal axes of the discharge electrodes 21, 22 may be in the Z direction in FIG. 1.

The seed light SL traveling parallel to the longitudinal axes of the discharge electrodes 21, 22 in the discharge space 24 is amplified and enters the convex cylindrical mirror 16. The seed light SL highly reflected by the convex cylindrical mirror 16 passes through the discharge space 24 while being expanded in the discharge direction, and is thus further amplified and enters the concave cylindrical mirror 18.

The seed light SL having entered the concave cylindrical mirror 18 is highly reflected and collimated with respect to the longitudinal axes of the discharge electrodes 21, 22 by the concave cylindrical mirror 18, again passes through the discharge space 24, and is further amplified. The amplified laser beam AL collimated by the concave cylindrical mirror 18 and amplified passes above an upper end of the convex cylindrical mirror 16 and is emitted from the laser system 1. The amplified laser beam AL has a profile equivalent to a profile of a beam section of the seed light SL expanded by 2.2 times in the V direction. The amplified laser beam AL emitted from the laser system 1 enters an exposure apparatus (not shown in FIG. 1).

3. Problem

In a current typical laser apparatus for an exposure apparatus, a gas laser device using an excimer laser gas as a laser medium is used on each of an oscillation stage (master oscillator) and an amplification stage (amplifier). However, a discharge-excited excimer laser apparatus has lower beam quality than a solid-state laser device due to its characteristic, and the beam emitted from the discharge-excited excimer laser apparatus has beam divergence (beam divergence angle) significantly different between a vertical direction and a transverse direction. Here, the vertical direction is a discharge direction, and the transverse direction is orthogonal to the discharge direction and orthogonal to a traveling direction of a laser beam.

On the other hand, in the laser system 1 in FIG. 1, the excimer amplifier 12 directly amplifies the seed light SL output from the ultraviolet solid-state laser device 10 with higher coherence than the discharge-excited excimer laser apparatus, thereby obtaining an amplified laser beam AL with higher beam quality, that is, with smaller beam divergence.

Considering that the hybrid laser apparatus having the configuration in FIG. 1 is connected to an exposure apparatus for use in place of the current discharge-excited excimer laser apparatus, beam divergence of the current excimer laser apparatus is different from beam divergence of the hybrid laser apparatus, which may cause the following problems.

[Problem 1]
Vignetting in an optical path occurs in the exposure apparatus, which affects throughput or the like.

[Problem 2]
A beam characteristic of the amplified laser beam AL output from the laser system 1 is different from a beam characteristic of the laser beam output from the current excimer laser apparatus, which may cause a problem that unnecessary light condensing occurs in the exposure apparatus to damage an optical element, or the like.

4. Embodiment 1

Figure 2:
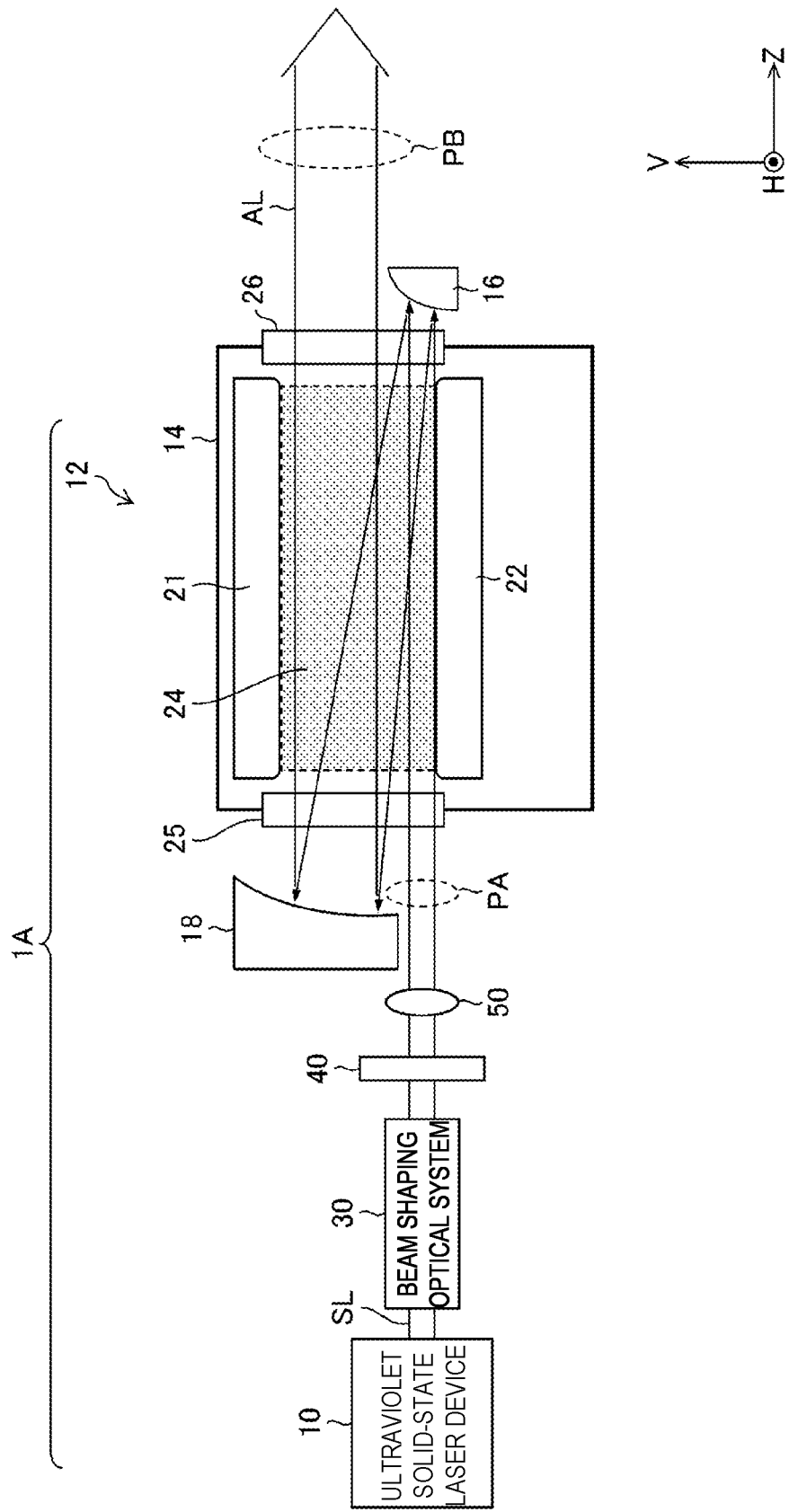
FIG. 2 schematically shows a configuration of a laser system according to Embodiment 1.

4.1 Configuration FIG. 2 schematically shows a configuration of a laser system 1A according to Embodiment 1. Differences from the laser system 1 in FIG. 1 will be described. The laser system 1A in FIG. 2 includes a beam shaping optical system 30, a random phase plate 40, and a convex lens 50 in an optical path between an ultraviolet solid-state laser device 10 and an excimer amplifier 12.

The beam shaping optical system 30 is arranged in the optical path between the ultraviolet solid-state laser device 10 and the excimer amplifier 12. The beam shaping optical system 30 shapes a circular profile of a beam section of the seed light SL output from the ultraviolet solid-state laser device 10 into an oval profile of the beam section. The beam shaping optical system 30 used may be either a transmission optical element or a reflection optical element. The seed light SL is an example of "laser beam" in the present disclosure. The beam shaping optical system 30 is an example of "beam shaping unit" in the present disclosure.

The random phase plate 40 is arranged in the optical path between the beam shaping optical system 30 and the excimer amplifier 12. The random phase plate 40 is a transmission optical element. A surface of the random phase plate 40 that the seed light SL enters is referred to as "first surface", and a surface from which the light having passed through the random phase plate 40 is emitted is referred to as "second surface". On the second surface of the random phase plate 40, a plurality of cells are periodically arranged. "Cell" refers to a minimum unit region of a predetermined shape, which is a region of a depression or a projection of an irregular pattern that provides a phase difference to the light. "Periodically" herein refers to the cells being spatially regularly arranged in a specific repeated pattern. On the second surface of the random phase plate 40, regions of depressions or projections with a phase difference of $\pi$ radian (half wavelength) are randomly arranged in units of the cells. The irregular pattern may be formed on the first surface of the random phase plate 40.

The convex lens 50 is arranged in the optical path between the random phase plate 40 and the excimer amplifier 12 at a position away from the random phase plate 40 by a focal length of the convex lens 50. The convex lens 50 is arranged such that the beam having passed through the random phase plate 40 enters the convex lens 50. The convex lens 50 collimates the beam having passed through the random phase plate 40 and allows the beam to enter the excimer amplifier 12. The convex lens 50 is an example of "collimating optical system" in the present disclosure. A collimating mirror may be arranged in place of the convex lens 50.

The excimer amplifier 12 expands the profile of the beam section of the seed light SL by M times in the V direction. Preferably, M is 2 to 6.

The excimer amplifier 12 in FIG. 2 is an example of "three-pass amplifier" in the present disclosure. The convex cylindrical mirror 16 is an example of "first mirror" and "convex mirror" in the present disclosure. The concave cylindrical mirror 18 is an example of "second mirror" in the present disclosure. The convex cylindrical mirror 16 and the concave cylindrical mirror 18 are examples of "first expanding optical system" in the present disclosure.

4.1.1 Specific Structure of Beam Shaping Optical System

Figure 3:
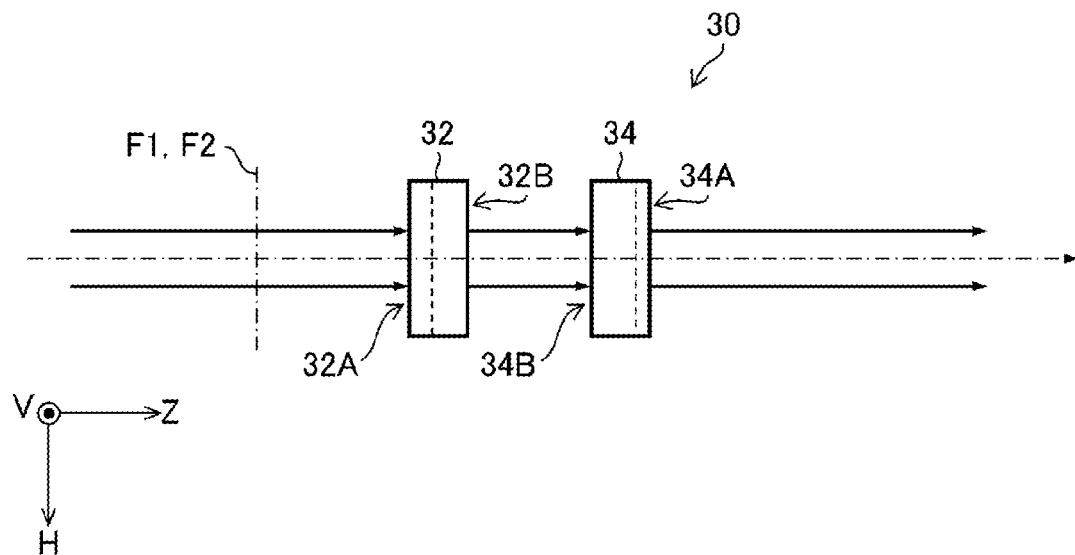
FIG. 3 is a schematic top view of a configuration of a beam shaping optical system.
Figure 4:
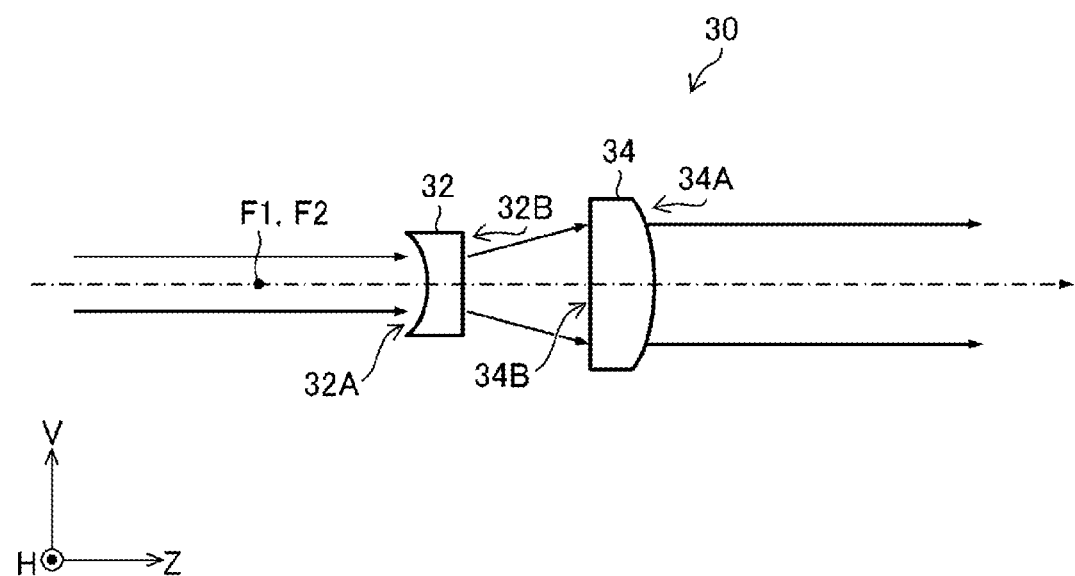
FIG. 4 is a schematic side view of the configuration of the beam shaping optical system.

FIGS. 3 and 4 are a schematic top view and a schematic side view of a configuration of the beam shaping optical system 30, respectively. The beam shaping optical system 30 in this example is a transmission beam shaping optical system including a pair of cylindrical lenses 32, 34. The cylindrical lenses 32, 34 are arranged in this order in the optical path of the seed light SL having entered the beam shaping optical system 30.

The cylindrical lens 32 is a cylindrical concave lens having a cylindrical concave surface 32A and a flat surface 32B opposite to the cylindrical concave surface 32A. The cylindrical lens 34 is a cylindrical convex lens having a cylindrical convex surface 34A and a flat surface 34B opposite to the cylindrical convex surface 34A. The cylindrical lenses 32, 34 constitute a Galilean beam shaping optical system.

Specifically, the cylindrical lens 32 is arranged such that the seed light SL having entered the beam shaping optical system 30 enters the cylindrical concave surface 32A. The cylindrical lens 34 is arranged such that the seed light SL having passed through the cylindrical lens 32 enters the flat surface 34B. The cylindrical lenses 32, 34 are arranged such that their focal positions F1, F2 match in the optical path of the seed light SL.

The cylindrical lenses 32, 34 are arranged such that the cylindrical concave surface 32A and the cylindrical convex surface 34A are curved in the V direction. Thus, the beam shaping optical system 30 in this example expands the seed light SL in the V direction.

"Expansion ratio" of the beam shaping optical system 30 is herein defined as below. Specifically, when an expansion rate in a first direction is E1 and an expansion rate in a second direction orthogonal to the first direction is E2, the first direction and the second direction being shaping directions of the beam shaping optical system 30, E2/E1 is defined as an expansion ratio.

The first direction is specified by a relationship with the discharge direction (V direction) of the excimer amplifier. The first direction corresponds to the V direction, and the second direction corresponds to the H direction. "Corresponding direction" refers to relatively the same direction in a beam section at each of different positions in an optical path. For example, if a mirror or the like that changes the traveling direction of the seed light SL exists in the optical path between the beam shaping optical system 30 and the excimer amplifier 12, there may be a case that the first direction of the beam shaping optical system 30 is different from the discharge direction of the excimer amplifier 12. However, it is understood that the first direction in the beam section of the seed light SL emitted from the beam shaping optical system 30 is relatively the same as the V direction in the beam section of the seed light SL entering the excimer amplifier 12.

If the mirror or the like that changes the traveling direction of the seed light SL does not exist in the optical path between the beam shaping optical system 30 and the excimer amplifier 12, and the seed light SL emitted from the beam shaping optical system 30 enters the excimer amplifier 12 while maintaining the first direction in the beam section of the seed light SL, the first direction may be parallel to the V direction.

The beam shaping optical system 30 in this example expands the beam section of the seed light SL such that the expansion ratio is lower than 1. The expansion ratio of the beam shaping optical system 30 is preferably 0.2 or higher. For example, E2 is 1, and E1 is higher than 1 and 5 or lower.

4.1.2 Example of Random Phase Plate

The random phase plate 40 can split an entering beam into fine beams in units of cells. The random phase plate 40 is designed to have a level difference between a depression and a projection such that a phase difference between a fine beam having passed through the depression and a fine beam having passed through the projection is, for example, $\pi$ radian.

The cell that is a minimum unit region of the irregular pattern that provides a phase difference to a split fine beam has, for example, a square shape. The cell may have a hexagonal shape or a polygonal shape, or may have various tessellatable shapes such that the cells of a single geometric shape can tessellate a plane without any gaps. The cell has an isotropic region shape.

"Isotropic" shape of the cell is defined as below. Specifically, when a length of the cell in the first direction corresponding to the V direction is d1 and a length of the cell in the second direction corresponding to the H direction is d2 in a plane parallel to the second surface of the random phase plate 40, an aspect ratio defined by d2/d1 is 0.8 to 1.2, and such a shape is defined as isotropic. For example, a regular hexagonal cell is taken as isotropic.

"Pitch" of the random phase plate 40 refers to a distance between the periodically arranged cells of the random phase plate 40 in the first direction and the second direction. When the cell is isotropic, the pitch in the first direction is substantially equal to the pitch in the second direction. A range of the pitch of the random phase plate 40 is, for example, 40 μm or more and 500 μm or less.

4.1.3 Example of Combination of Pitch of Random Phase Plate and Focal Lengths of Convex Lens, Convex Cylindrical Mirror, and Concave Cylindrical Mirror When the pitch of the random phase plate 40 is 40 μm, examples of focal lengths of the convex lens 50, the convex cylindrical mirror 16, and the concave cylindrical mirror 18 are 1000 mm, −333 mm, and 1333 mm, respectively.

When the pitch of the random phase plate 40 is 60 μm, examples of the focal lengths of the convex lens 50, the convex cylindrical mirror 16, and the concave cylindrical mirror 18 are 1450 mm, −333 mm, and 1333 mm, respectively.

When the pitch of the random phase plate 40 is 80 μm, examples of the focal lengths of the convex lens 50, the convex cylindrical mirror 16, and the concave cylindrical mirror 18 are 1900 mm, −333 mm, and 1333 mm, respectively.

As such, in the configuration of the laser system 1A, the pitch of the random phase plate 40 is preferably 40 μm to 80 μm. The focal length of the convex lens 50 is preferably 1000 mm to 1900 mm. With smaller pitch of the random phase plate 40, divergence of the seed light SL having passed through the random phase plate 40 increases, and thus a shorter focal length of the convex lens 50 is preferable.

4.2 Operation

The ultraviolet solid-state laser device 10 outputs the seed light SL having the beam section of the circular profile. The seed light SL output from the ultraviolet solid-state laser device 10 enters the beam shaping optical system 30. The beam shaping optical system 30 expands the seed light SL in the V direction with the cylindrical lens 32, and collimates the seed light SL expanded in the V direction with the cylindrical lens 34.

Figure 5:
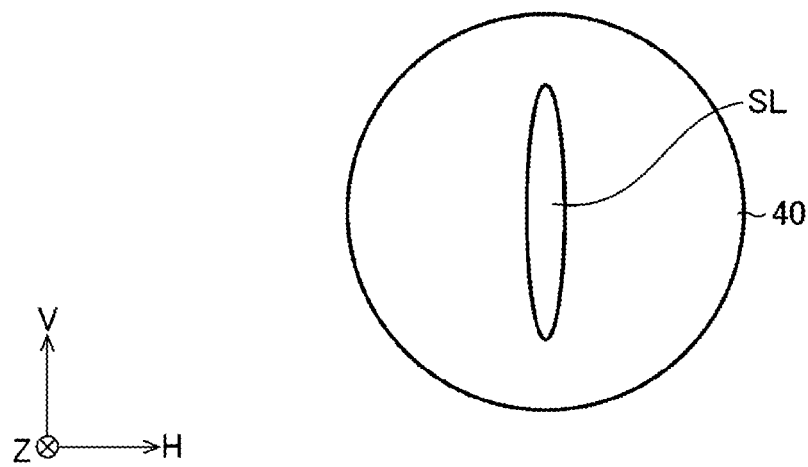
FIG. 5 diagrammatically shows seed light SL entering a random phase plate.

FIG. 5 diagrammatically shows the profile of the beam section of the seed light SL emitted from the beam shaping optical system 30 and entering the random phase plate 40. FIG. 5 shows the random phase plate 40 viewed from the side of the first surface. As shown in FIG. 5, the profile of the beam section of the seed light SL entering the random phase plate 40 has an oval shape expanded at the expansion ratio E2/E1. A light intensity distribution in the beam section of the seed light SL entering the random phase plate 40 is a Gaussian distribution.

Figure 6:
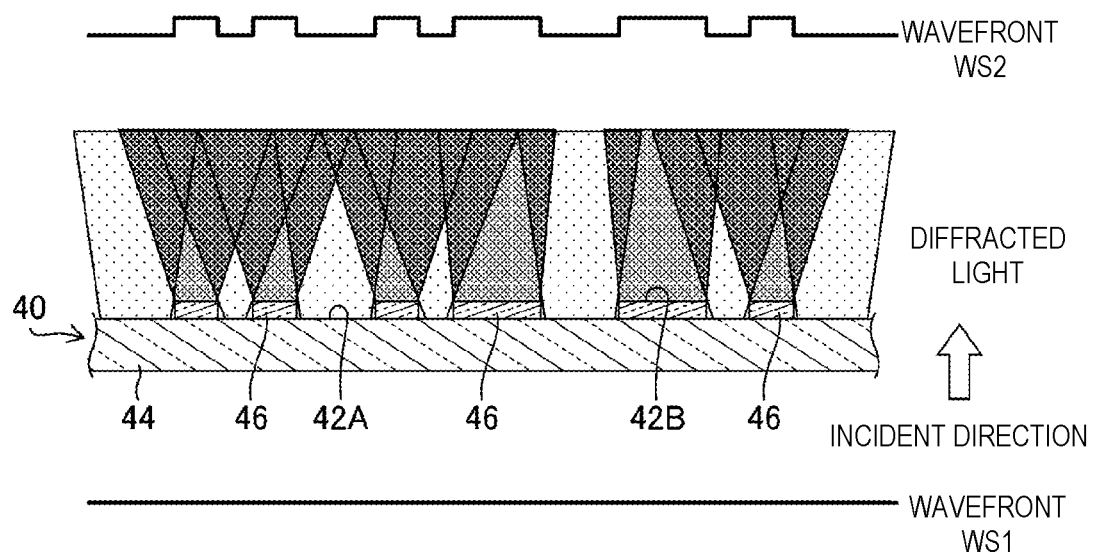
FIG. 6 diagrammatically illustrates a function of the random phase plate.

FIG. 6 diagrammatically illustrates a function of the random phase plate 40. The laser beam enters the random phase plate 40 from a bottom side in FIG. 6, and the laser beam having passed through the random phase plate 40 is emitted toward a top side in FIG. 6.

A wavefront WS1 of the laser beam entering the random phase plate 40 has a constant phase. FIG. 6 shows the constant phase of the wavefront WS1 by a straight line.

The random phase plate 40 splits the laser beam entering the first surface into a plurality of beams according to shapes of regions of a depression 42A and a projection 42B. In the depression 42A, no film 46 is provided on a surface of a light transmissive substrate 44, and in the projection 42B, a film 46 is provided on the light transmissive substrate 44. Then, the random phase plate 40 provides a phase difference π between the fine beam having passed through the depression 42A and the fine beam having passed through the projection 42B. Given that the phase of the fine beam having passed through the depression 42A is "0 phase" and the phase of the fine beam having passed through the projection 42B is "π phase", the beam having passed through the random phase plate 40 travels with the fine beams of the two types of phases being superimposed.

Thus, a wavefront WS2 of the laser beam emitted from the random phase plate 40 has a spatially random phase difference due to the irregular pattern of the depression 42A and the projection 42B. In FIG. 6, a pattern of the phase difference reflecting the shape of the irregular pattern of the random phase plate 40 is shown by the wavefront WS2.

The fine beam of "0 phase" and the fine beam of "π phase" of the seed light SL having passed through the random phase plate 40 do not interfere with each other, and thus the light intensity distribution in the beam section is not a Gaussian distribution but nearly a top-hat distribution.

As a result, beam quality of the seed light SL entering the excimer amplifier 12 can be close to beam quality of a current excimer laser apparatus.

The fine beam passing through the depression 42A and the fine beam passing through the projection 42B each travel as diffracted light having a diffracting angle according to a size of the region of the depression 42A or the projection 42B.

The seed light SL having passed through the random phase plate 40 enters the convex lens 50. The convex lens 50 collimates the entering seed light SL.

The seed light SL collimated by the convex lens 50 enters the excimer amplifier 12. The excimer amplifier 12 allows the seed light SL incident from the convex lens 50 to pass three times through the discharge space 24 for amplification and to be emitted as an amplified laser beam AL. In this case, the excimer amplifier 12 expands the profile of the beam section of the seed light SL by M times in the V direction. The convex lens 50 is arranged between the random phase plate 40 and the excimer amplifier 12 to allow the laser beam to appropriately propagate into the three-pass amplifier.

Figure 7:
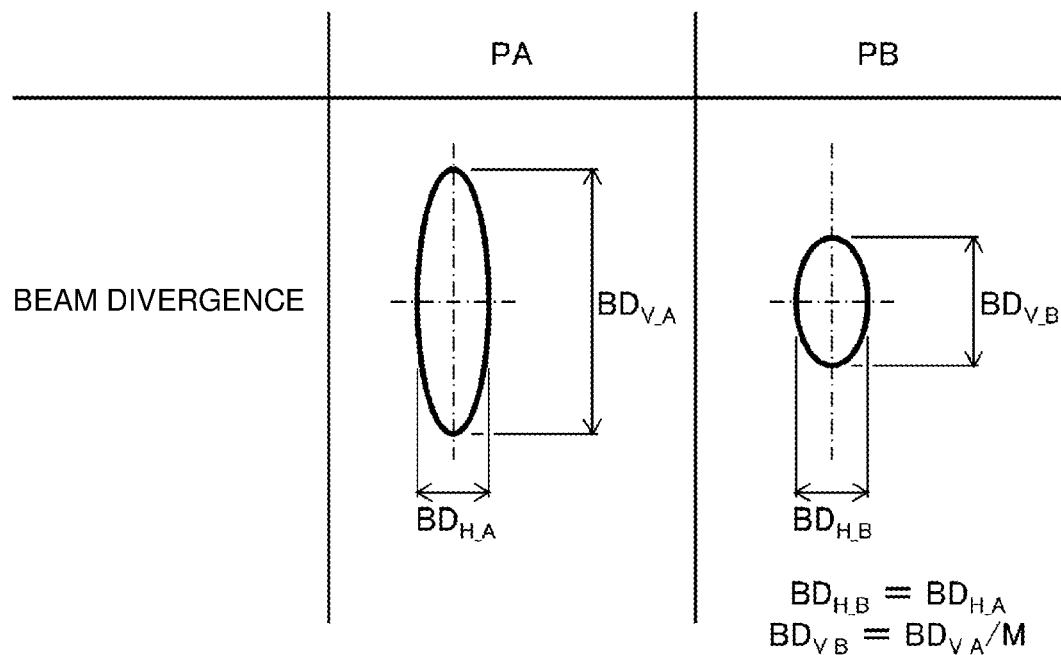
FIG. 7 shows beam divergence of the seed light SL at a point PA and beam divergence of an amplified laser beam AL at a point PB.

FIG. 7 shows beam divergence of the seed light SL at a point PA and beam divergence of the amplified laser beam AL at a point PB in FIG. 2. The beam divergence of the seed light SL at the point PA is $BD_{V\_A}$ in the V direction and $BD_{H\_A}$ in the H direction.

When the laser beam having the beam section of the oval profile enters an entrance plane of the random phase plate 40, the profile of the beam section formed on an exit plane is an oval shape formed of a collection of a plurality of point light sources. The laser beam emitted from the point light sources is collimated by the convex lens 50 to cause beam divergence according to a difference in position of the point light sources on the random phase plate 40. In the laser system 1A, since the beam profile on the exit plane of the random phase plate 40 is oval, the beam divergence at the point PA in FIG. 2 is also oval. As such, the profile of the beam section shaped by the beam shaping optical system 30 is reflected on the beam divergence.

On the other hand, the beam divergence of the seed light SL at the point PB is $BD_{V\_B}$ in the V direction and $BD_{H\_B}$ in the H direction. The excimer amplifier 12 expands the profile of the beam section of the seed light SL by M times in the V direction. Thus, according to the etendue conservation law, the beam divergence of the amplified laser beam AL is 1/M times larger, only in the V direction, than the beam divergence of the seed light SL. Specifically, relationships of $BD_{H\_B}$ being equal to $BD_{H\_A}$ and $BD_{V\_B}$ being equal to $BD_{V\_A}/M$ are satisfied.

The beam profile of the current excimer laser apparatus is a top-hat distribution, and the beam divergence is larger in the V direction than in the H direction. With the laser system 1A according to Embodiment 1, the light intensity distribution in the beam section of the amplified laser beam AL is a top-hat distribution. Also, the beam divergence of the amplified laser beam AL is larger in both the H direction and the V direction and is larger in the V direction than in the H direction as compared to that in the laser system without a beam shaping optical system 30, a random phase plate 40, and a convex lens 50. Thus, a beam profile and beam divergence close to those of the current excimer laser apparatus are achieved.

The expansion ratio of the beam shaping optical system 30, the pitch of the random phase plate 40, and the focal length of the convex lens 50 can be designed for a target beam profile and target beam divergence. Specifically, changing the expansion ratio of the beam shaping optical system 30, the pitch of the random phase plate 40, and the focal length of the convex lens 50 can achieve a desired beam profile and desired beam divergence.

Here, since the excimer amplifier 12 expands the profile of the beam section of the seed light SL by M times in the V direction, the convex lens 50 inputs, to the excimer amplifier 12, a laser beam having beam divergence M times larger in the V direction than desired beam divergence.

4.3 Effect

With the laser system 1A according to Embodiment 1, the beam shaping optical system 30 shapes the profile of the beam section of the seed light SL into the oval shape and then allows the seed light SL to enter the random phase plate 40, and the convex lens 50 collimates the seed light SL, thereby allowing change of a length-to-width ratio of the beam divergence of the seed light SL. For a circular profile of the beam section of the seed light SL entering the random phase plate 40, it is difficult to adjust a length-to-width ratio of beam divergence. However, the profile of the beam section of the seed light SL is shaped into the oval shape and then the seed light SL is allowed to enter the random phase plate 40 as in the laser system 1A, thereby allowing any change of the length-to-width ratio of the beam divergence.

This allows generation of an excimer laser beam having a beam characteristic close to that of the excimer laser beam generated by the current excimer laser apparatus.

5. Embodiment 2

5.1 Configuration

Figure 8:
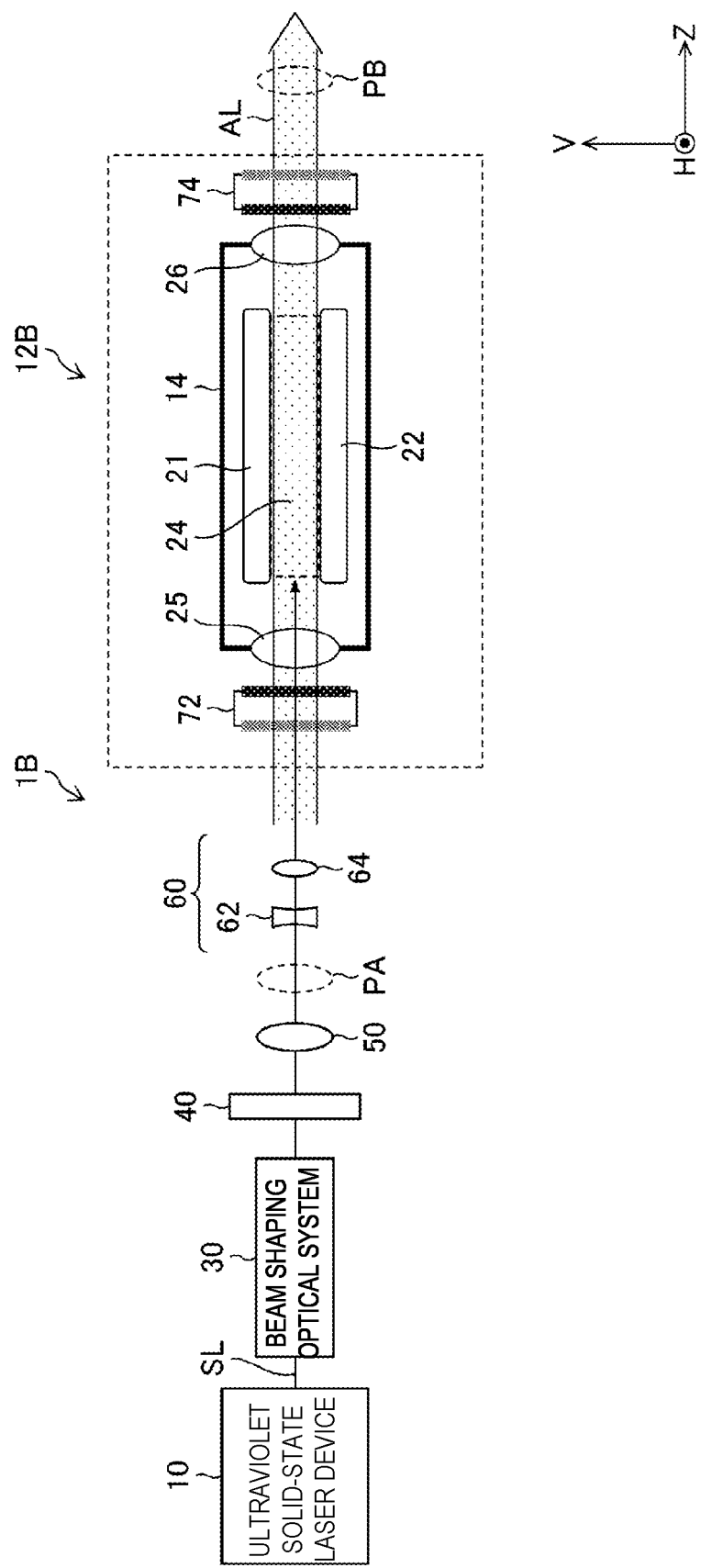
FIG. 8 schematically shows a configuration of a laser system according to Embodiment 2.

FIG. 8 schematically shows a configuration of a laser system 1B according to Embodiment 2. In Embodiment 2, the excimer amplifier 12 in Embodiment 1 is changed from the three-pass amplifier to a Fabry-Perot (resonator) amplifier.

The laser system 1B in FIG. 8 includes an excimer amplifier 12B that is the Fabry-Perot amplifier. The excimer amplifier 12B includes a rear mirror 72, an output coupling mirror 74, and a chamber 14, and the chamber 14 is arranged between the rear mirror 72 and the output coupling mirror 74.

The rear mirror 72 and the output coupling mirror 74 are partially reflective mirrors that reflect part of the laser beam and transmit part of the laser beam. Reflectance of the rear mirror 72 is preferably higher than reflectance of the output coupling mirror 74. The reflectance of the rear mirror 72 is, for example, 80% to 90%. The rear mirror 72 and the output coupling mirror 74 constitute an optical resonator. The excimer amplifier 12B is an example of "Fabry-Perot resonator" in the present disclosure.

In the laser system 1B in FIG. 8, a beam expanding optical system 60 is arranged in an optical path between the convex lens 50 and the excimer amplifier 12B. The beam expanding optical system 60 expands the profile of the beam section of the seed light SL by M times in the V direction.

The excimer amplifier 12 according to Embodiment 1 includes therein the expanding optical system. On the other hand, in Embodiment 2, the beam expanding optical system 60 expands the profile of the beam section of the seed light SL before the seed light SL enters the excimer amplifier 12B. This provides the profile of the beam section of the seed light SL entering the excimer amplifier 12B such that the seed light SL is most efficiently amplified by the excimer amplifier 12B.

The beam expanding optical system 60 includes a cylindrical concave lens 62 and a cylindrical convex lens 64. A magnification of the beam expanding optical system 60 is M times in the first direction corresponding to the V direction, and one time in the second direction corresponding to the H direction. In the example in FIG. 8, the first direction is parallel to the V direction, and the second direction is parallel to the H direction. Here, the beam expanding optical system 60 is a transmission optical system by way of example, but may be a reflection optical system. The beam expanding optical system 60 is an example of "second expanding optical system" in the present disclosure.

Other configurations are the same as those of the laser system 1A described with reference to FIG. 2. The pitch of the random phase plate 40 and the focal length of the convex lens 50 may be used in the same combination.

5.2 Operation

As in Embodiment 1, the beam shaping optical system 30 expands, in the V direction, the beam profile of the seed light SL output from the ultraviolet solid-state laser device 10 and having a wavelength of about 193.4 nm, and the random phase plate 40 and the convex lens 50 change beam divergence.

The seed light SL collimated by the convex lens 50 is expanded by M times in the V direction by the beam expanding optical system 60, and enters the excimer amplifier 12B.

The seed light SL having passed through the rear mirror 72 of the excimer amplifier 12B enters the discharge space 24 through the window 25. The seed light SL is amplified by the optical resonator constituted by the output coupling mirror 74 and the rear mirror 72, and the amplified laser beam AL is emitted from the output coupling mirror 74. The amplified laser beam AL emitted from the output coupling mirror 74 enters an exposure apparatus (not shown in FIG. 8).

Beam divergence of the seed light SL emitted from the convex lens 50 at the point PA and beam divergence of the amplified laser beam AL emitted from the output coupling mirror 74 at the point PB are the same as the beam divergence at the point PA and the beam divergence at the point PB in FIG. 7.

Here, since the beam expanding optical system 60 expands the profile of the beam section of the seed light SL by M times in the V direction, the convex lens 50 inputs, to the beam expanding optical system 60, a laser beam having beam divergence M times larger in the V direction than desired beam divergence.

5.3 Effect

The laser system 1B according to Embodiment 2 also provides the same effect as in Embodiment 1. Specifically, a light intensity distribution in the beam section and a length-to-width ratio of the beam divergence can be changed. This allows a beam characteristic of the laser beam to be close to that of the excimer laser beam generated by the current excimer laser apparatus.

6. Embodiment 3

6.1 Configuration

Figure 9:
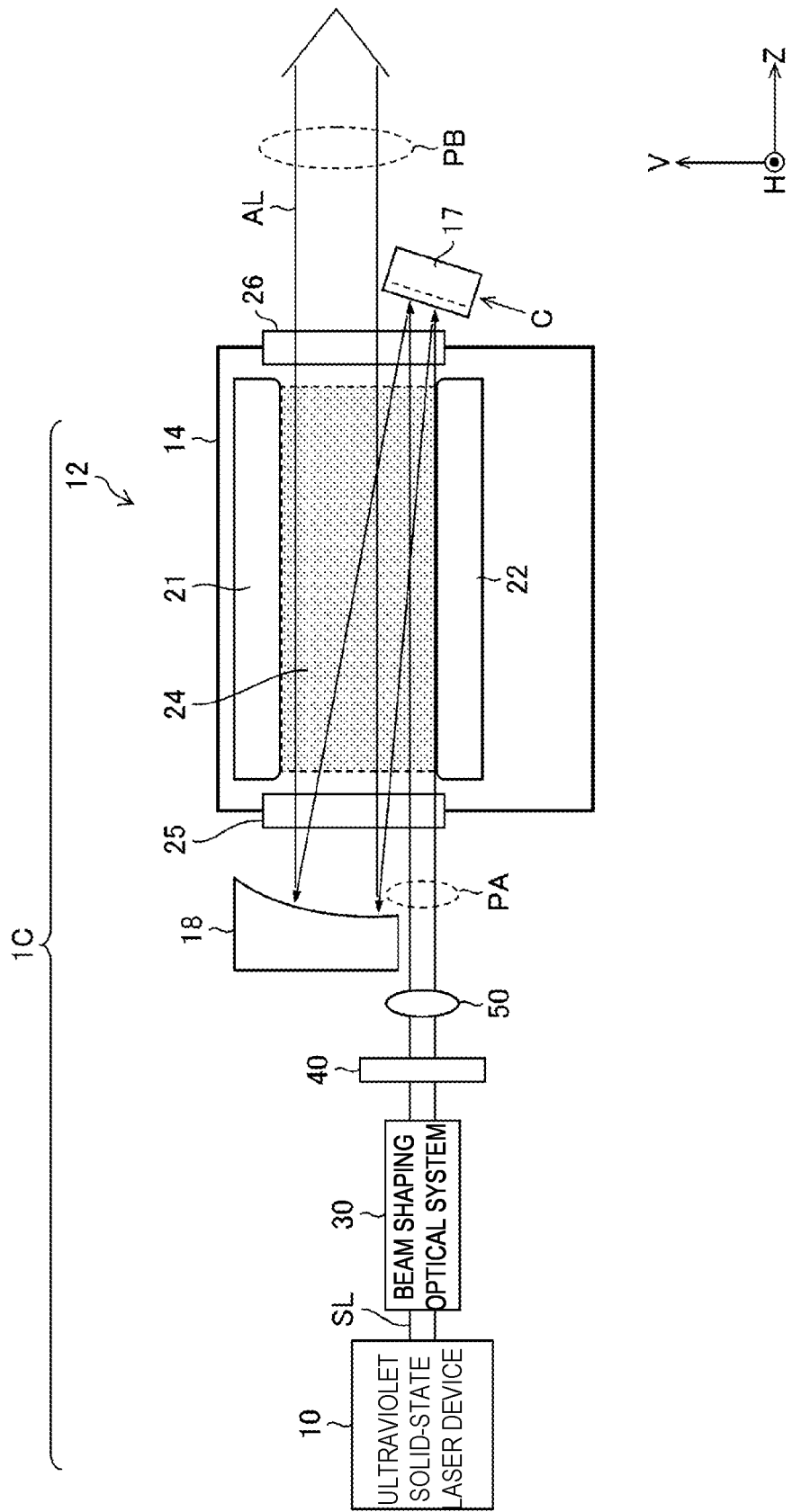
FIG. 9 schematically shows a configuration of a laser system according to Embodiment 3.

FIG. 9 schematically shows a configuration of a laser system 1C according to Embodiment 3. In the laser system 1C according to Embodiment 3, the convex cylindrical mirror 16 in the excimer amplifier 12 in FIG. 2 is changed to a concave cylindrical mirror 17. Other configurations are the same as those of the laser system 1A described with reference to FIG. 2.

Figure 10:
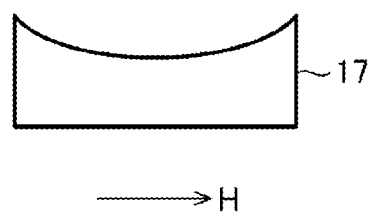
FIG. 10 shows a concave cylindrical mirror in FIG. 9 taken in the direction of arrow C.

FIG. 10 shows the concave cylindrical mirror 17 in FIG. 9 taken in the direction of arrow C. As shown in FIG. 10, the concave cylindrical mirror 17 has a concave reflective surface curved in the H direction.

The concave reflective surface of the concave cylindrical mirror 17 is coated with a highly reflective film that highly reflects the beam having the wavelength of about 193.4 nm. The concave cylindrical mirror 17 and the concave cylindrical mirror 18 are arranged to allow the seed light SL output from the ultraviolet solid-state laser device 10 and having the wavelength of 193.4 nm to pass three times through the discharge space 24. Thus, the seed light SL is amplified in the discharge space 24. In the laser system 1C, the optical system is designed such that the beam having passed through the excimer amplifier 12 has a desired beam diameter. The concave cylindrical mirror 17 is an example of "first mirror" and "concave mirror" in the present disclosure.

6.1.1 Example of Combination of Pitch of Random Phase Plate and Focal Lengths of Convex Lens, First Concave Cylindrical Mirror, and Second Concave Cylindrical Mirror A range of the pitch of the random phase plate 40 is, for example, 20 μm or more and 500 μm or less. The pitch of the random phase plate 40 is preferably 40 μm or more and 500 μm or less, and more preferably 40 μm or more and 80 μm or less. The laser system 1C according to Embodiment 3 can use a random phase plate 40 having a smaller pitch than the laser system 1A according to Embodiment 1.

When the pitch of the random phase plate 40 is 20 μm, examples of focal lengths of the convex lens 50, the concave cylindrical mirror 17, and the concave cylindrical mirror 18 are 164 mm, 1000 mm, and 2000 mm, respectively.

When the pitch of the random phase plate 40 is 40 μm, 60 μm, or 80 μm, examples of the focal lengths of the convex lens 50, the concave cylindrical mirror 17, and the concave cylindrical mirror 18 are 150 mm, 950 mm, and 1950 mm, respectively.

As such, in the configuration of the laser system 1C, the pitch of the random phase plate 40 is preferably 20 μm to 80 μm. The focal length of the convex lens 50 is preferably 150 mm to 164 mm.

6.2 Operation

The beam shaping optical system 30 expands, in the V direction, the beam profile of the seed light SL output from the ultraviolet solid-state laser device 10, and the random phase plate 40 and the convex lens 50 change beam divergence.

Here, there may be a case that divergence of the seed light SL having passed through the random phase plate 40 significantly increases depending on the pitch of the random phase plate 40 and that the seed light SL cannot be collimated only by the convex lens 50. In the laser system 1C, the concave cylindrical mirror 17 is used to adjust the divergence of the seed light SL.

The convex lens 50 collimates the beam having passed through the random phase plate 40 to reduce beam divergence. The seed light SL collimated by the convex lens 50 enters the excimer amplifier 12. The excimer amplifier 12 allows the seed light SL incident from the convex lens 50 to pass three times through the discharge space 24 for amplification and to be emitted as an amplified laser beam AL. In this case, the excimer amplifier 12 collimates the beam in the H direction with the concave cylindrical mirror 17, and collimates the beam in the V direction with the concave cylindrical mirror 18.

Beam divergence of the seed light SL at the point PA and beam divergence of the amplified laser beam AL at the point PB in FIG. 9 are the same as the beam divergence at the point PA and the beam divergence at the point PB in FIG. 7.

6.3 Effect

The laser system 1C according to Embodiment 3 also provides the same effect as in Embodiment 1. Specifically, a light intensity distribution in the beam section and a length-to-width ratio of the beam divergence can be changed. This allows a beam characteristic of the laser beam to be close to that of the excimer laser beam generated by the current excimer laser apparatus. Also, the concave cylindrical mirror 17 and the concave cylindrical mirror 18 adjust the beam divergence in the H direction and the V direction, thereby allowing the beam to appropriately pass through the optical system in the excimer amplifier 12.

7. Embodiment 4

7.1 Configuration

Figure 11:
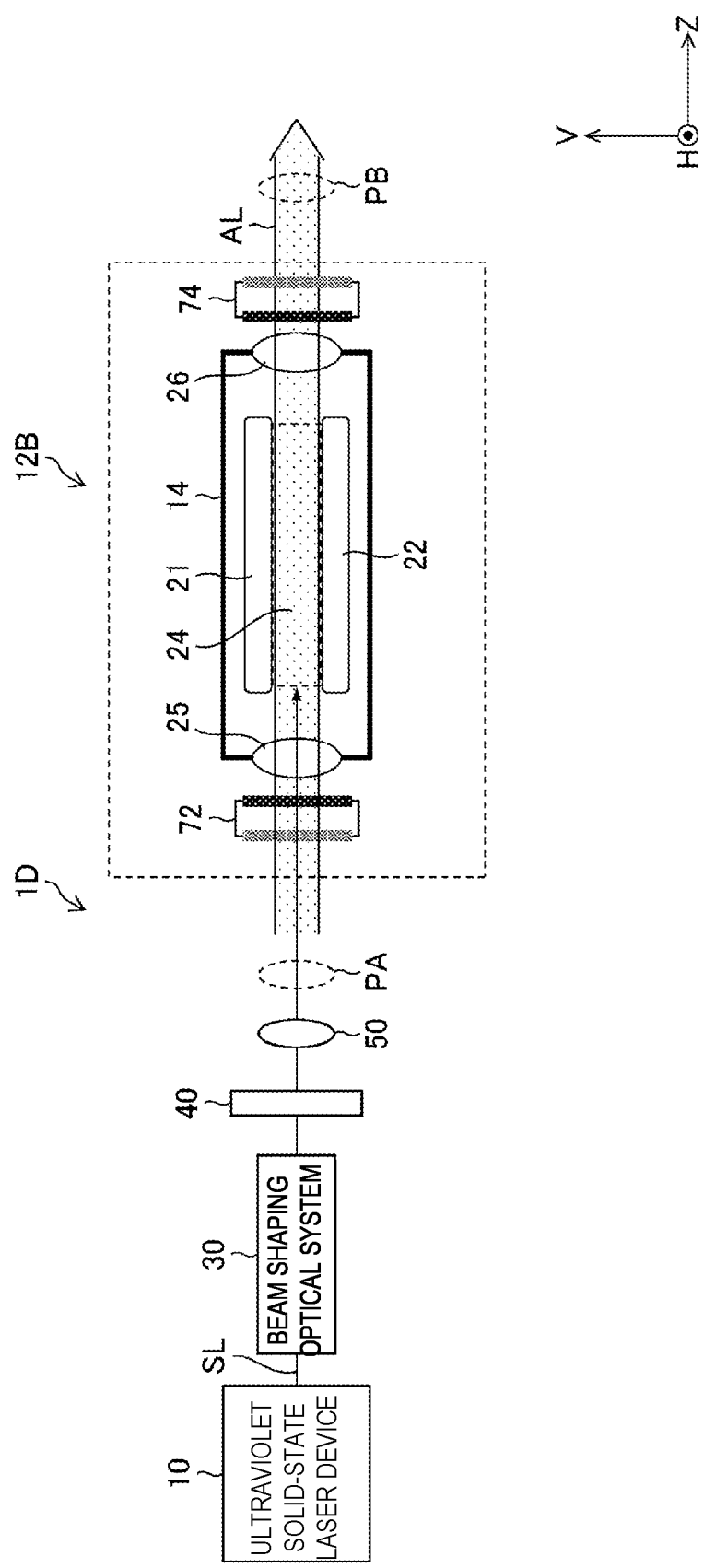
FIG. 11 schematically shows a configuration of a laser system according to Embodiment 4.

FIG. 11 schematically shows a configuration of a laser system 1D according to Embodiment 4. In Embodiment 4, the beam expanding optical system 60 is removed from the laser system 1B according to Embodiment 2.

In Embodiment 2, the beam expanding optical system 60 expands the profile of the beam section before the seed light SL enters the excimer amplifier 12B. On the other hand, in Embodiment 4, a length-to-width ratio for expansion of the beam section by the beam shaping optical system 30 and the pitch of the random phase plate 40 are adjusted to eliminate the need for the beam expanding optical system 60.

A preferable range of the pitch of the random phase plate 40 is, for example, 80 μm or more and 500 μm or less. The convex lens 50 used has a longer focal length than the convex lens 50 in the laser system 1B.

7.2 Operation

As in Embodiment 2, the beam shaping optical system 30 expands, in the V direction, the beam profile of the seed light SL output from the ultraviolet solid-state laser device 10, and the random phase plate 40 and the convex lens 50 change beam divergence.

The seed light SL collimated by the convex lens 50 enters the excimer amplifier 12B.

Beam divergence of the seed light SL emitted from the convex lens 50 at the point PA and beam divergence of the amplified laser beam AL emitted from the output coupling mirror 74 at the point PB are the same, and are both $BD_{V\_B}$ in the V direction and $BD_{H\_B}$ in the H direction.

7.3 Effect

The laser system 1D according to Embodiment 4 also provides the same effect as in Embodiment 1. Specifically, a length-to-width ratio of the beam divergence can be changed. This allows generation of an excimer laser beam having a beam characteristic close to that of the excimer laser beam generated by the current excimer laser apparatus.

8. Embodiment 5

8.1 Configuration

Figure 12:
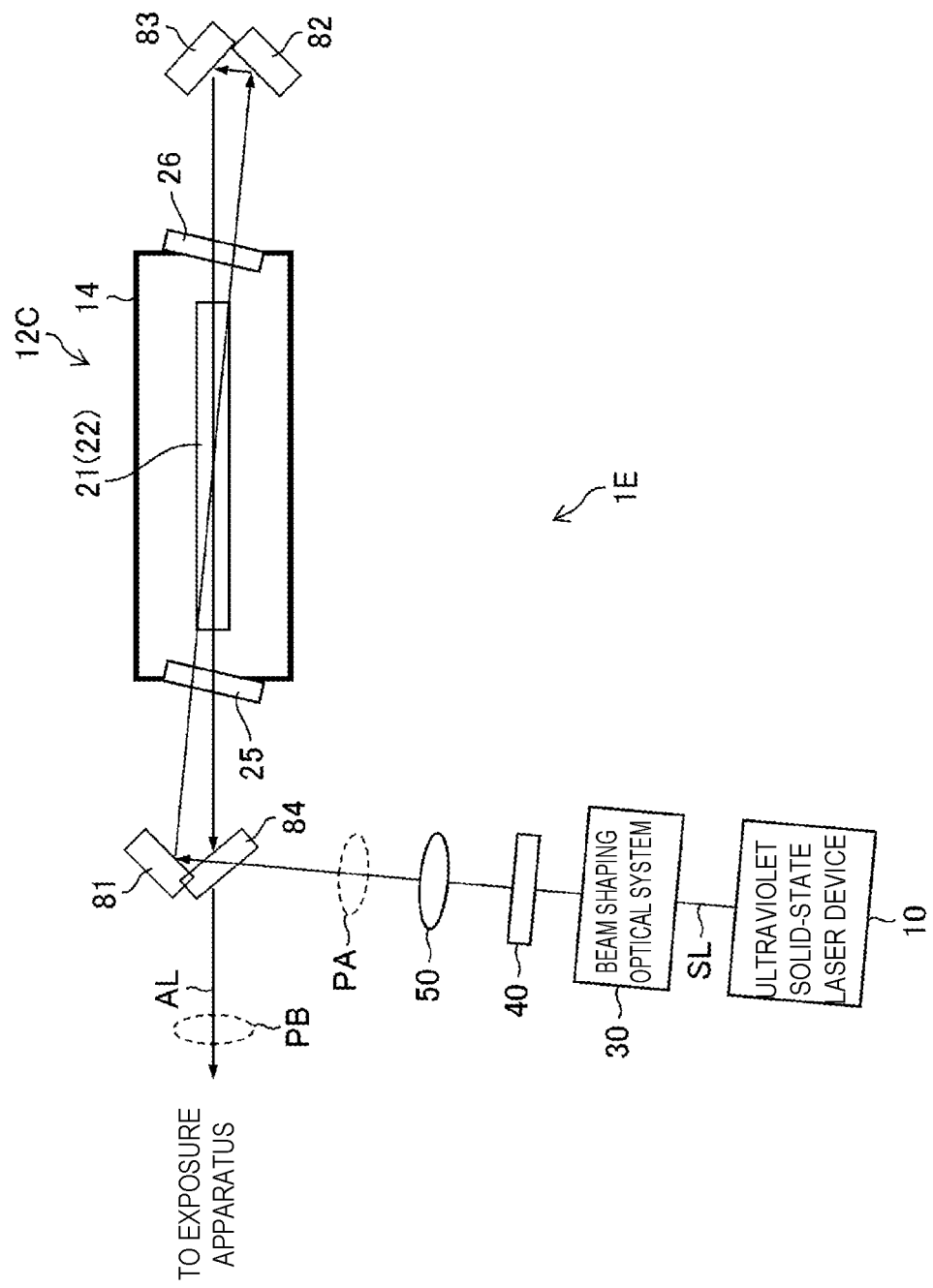
FIG. 12 schematically shows a configuration of a laser system according to Embodiment 5.

FIG. 12 schematically shows a configuration of a laser system 1E according to Embodiment 5. In Embodiment 5, the excimer amplifier 12 in the laser system 1A according to Embodiment 1 is changed from the three-pass amplifier to a ring resonator amplifier.

The laser system 1E in FIG. 12 includes an excimer amplifier 12C that is a ring resonator amplifier. The excimer amplifier 12C includes a chamber 14, a pair of discharge electrodes 21, 22, highly reflective mirrors 81, 82, 83, and an output coupling mirror 84. The output coupling mirror 84 is a partial reflective mirror that transmits part of the laser beam and reflects part of the laser beam.

The discharge electrodes 21, 22 are arranged to face each other with a space therebetween in a direction perpendicular to the plane of FIG. 12.

The output coupling mirror 84 and the highly reflective mirrors 81, 82, 83 constitute a ring resonator.

A preferable range of the pitch of the random phase plate 40 is, for example, 80 μm or more and 500 μm or less. As in the laser system 1D, the convex lens 50 used has a longer focal length than the convex lens 50 in the laser system 1B.

8.2 Operation

The beam shaping optical system 30 expands, in the V direction, the beam profile of the seed light SL output from the ultraviolet solid-state laser device 10, and the random phase plate 40 and the convex lens 50 change beam divergence.

The seed light SL collimated by the convex lens 50 enters the output coupling mirror 84.

Part of the seed light SL having entered the output coupling mirror 84 passes through the output coupling mirror 84 and is reflected by the highly reflective mirror 81. The seed light SL reflected by the highly reflective mirror 81 passes through the window 25 and travels to the discharge space 24 between the discharge electrodes 21, 22.

When the seed light SL exists in the discharge space 24, control to cause discharge in the discharge space 24 is performed to amplify the seed light SL. The amplified laser beam is emitted from the chamber 14 through the window 26. The laser beam emitted through the window 26 is highly reflected by the highly reflective mirrors 82, 83, again travels through the window 26 to the discharge space 24 in the chamber 14, and is amplified. The amplified laser beam is emitted from the chamber 14 through the window 25. The amplified laser beam emitted from the window 25 enters the output coupling mirror 84. Part of the amplified laser beam having entered the output coupling mirror 84 passes through the output coupling mirror 84 and is emitted from the excimer amplifier 12C as the amplified laser beam AL. The other part of the amplified laser beam having entered the output coupling mirror 84 is reflected by the output coupling mirror 84, and returned as feedback light to the ring optical resonator.

Beam divergence of the seed light SL emitted from the convex lens 50 at the point PA and beam divergence of the amplified laser beam AL having passed through the output coupling mirror 84 at the point PB are the same, and are both $BD_{V\_B}$ in the V direction and $BD_{H\_B}$ in the H direction.

8.3 Effect

The laser system 1E according to Embodiment 5 also provides the same effect as in Embodiment 1. Specifically, a length-to-width ratio of the beam divergence can be changed. This allows generation of an excimer laser beam having a beam characteristic close to that of the excimer laser beam generated by the current excimer laser apparatus.

9. Electronic Device Manufacturing Method

Figure 13:
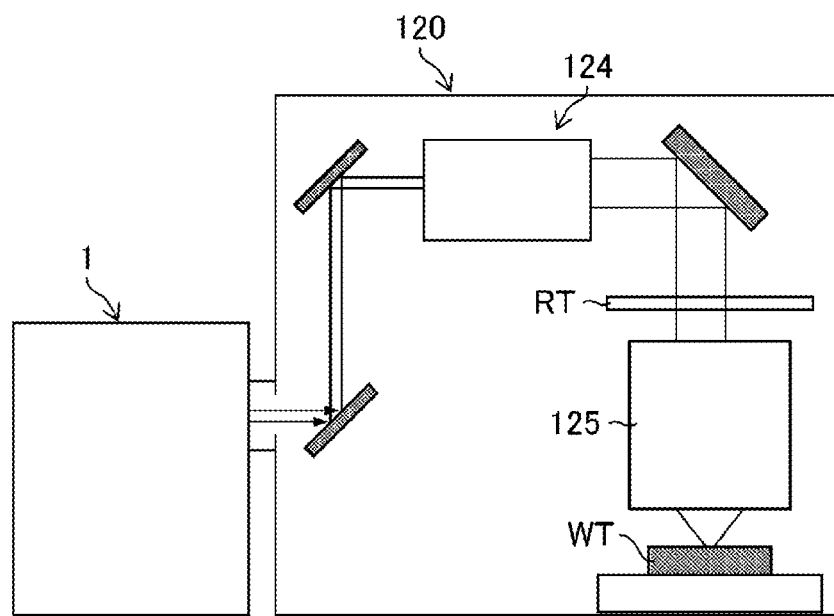
FIG. 13 schematically shows an exemplary configuration of an exposure apparatus.

FIG. 13 schematically shows an exemplary configuration of an exposure apparatus 120. In FIG. 13, the exposure apparatus 120 includes an illumination optical system 124 and a projection optical system 125. The illumination optical system 124 illuminates, with a laser beam incident from the laser system 1, a reticle pattern on a reticle stage RT. The projection optical system 125 reduces and projects the laser beam having passed though the reticle and forms an image thereof on a workpiece (not shown) arranged on a workpiece table WT. The workpiece is a photosensitive substrate such as a semiconductor wafer coated with photoresist. The exposure apparatus 120 synchronously translates the reticle stage RT and the workpiece table WT to expose the laser beam reflecting the reticle pattern onto the workpiece. Through the exposure process as described above, a device pattern is transferred onto the semiconductor wafer, thereby manufacturing a semiconductor device. The semiconductor device is an example of "electronic device" in the present disclosure. The laser system 1 may be the laser system 1A, 1B, 1C, 1D, or 1E described in the embodiments.

10. Others

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more". Further, "at least one of A, B, and C" should be interpreted to mean any of A, B, C, A+B, A+C, B+C, and A+B+C as well as to include combinations of the any thereof and any other than A, B, and C.

What is claimed is:

1. A laser system comprising:
   a solid-state laser device configured to output a laser beam;
   an excimer amplifier including a pair of discharge electrodes arranged to face each other with a discharge space therebetween, the laser beam passing through the discharge space, the excimer amplifier being configured to amplify the laser beam;

a beam shaping unit arranged in an optical path between the solid-state laser device and the excimer amplifier, the beam shaping unit being configured to expand a beam section of the laser beam output from the solid-state laser device;
a random phase plate arranged in an optical path between the beam shaping unit and the excimer amplifier; and
a collimating optical system arranged in an optical path between the random phase plate and the excimer amplifier,
when a traveling direction of the laser beam entering the excimer amplifier is a Z direction, a discharge direction of the discharge electrodes is a V direction, a direction orthogonal to the V direction and the Z direction is an H direction, a shaping direction of the beam shaping unit corresponding to the V direction in the beam section of the laser beam entering the excimer amplifier is a first direction, a shaping direction of the beam shaping unit corresponding to the H direction in the beam section is a second direction, an expansion rate in the first direction is E1, and an expansion rate in the second direction is E2, the beam shaping unit expanding the beam section of the laser beam such that an expansion ratio defined by E2/E1 is lower than 1.

2. The laser system according to claim 1, wherein the collimating optical system includes a convex lens.

3. The laser system according to claim 1, wherein the beam shaping unit includes a transmission optical element.

4. The laser system according to claim 3, wherein the transmission optical element is a cylindrical lens.

5. The laser system according to claim 1, wherein E2 is 1.

6. The laser system according to claim 1, wherein the excimer amplifier is a three-pass amplifier that allows the laser beam to pass three times through the discharge space to amplify the laser beam.

7. The laser system according to claim 5, wherein the excimer amplifier includes a first expanding optical system with the discharge space therebetween.

8. The laser system according to claim 7, wherein
the first expanding optical system expands the laser beam by M times in the V direction, and
the collimating optical system inputs, to the excimer amplifier, a laser beam having beam divergence M times larger in the V direction than desired beam divergence of the laser beam output from the excimer amplifier.

9. The laser system according to claim 7, wherein
the first expanding optical system includes a first mirror and a second mirror facing each other with the discharge space therebetween, and
the first mirror that the laser beam having passed through the discharge space first enters is a convex mirror.

10. The laser system according to claim 8, wherein a pitch of the random phase plate is 40 μm to 80 μm.

11. The laser system according to claim 9, wherein a focal length of the collimating optical system is 1000 mm to 1900 mm.

12. The laser system according to claim 5, wherein
the excimer amplifier includes a first mirror and a second mirror facing each other with the discharge space therebetween, and
the first mirror is a concave cylindrical mirror curved in the H direction, and
the second mirror is a concave cylindrical mirror curved in the V direction.

13. The laser system according to claim 11, wherein a pitch of the random phase plate is 20 μm to 80 μm.

14. The laser system according to claim 12, wherein a focal length of the collimating optical system is 150 mm to 164 mm.

15. The laser system according to claim 1, wherein the excimer amplifier is a Fabry-Perot resonator.

16. The laser system according to claim 15, further comprising a second expanding optical system in an optical path between the Fabry-Perot resonator and the collimating optical system.

17. The laser system according to claim 16, wherein
the second expanding optical system expands the laser beam by M times in the V direction, and
the collimating optical system inputs, to the second expanding optical system, a laser beam having beam divergence M times larger in the V direction than desired beam divergence of the laser beam output from the excimer amplifier.

18. The laser system according to claim 1, wherein the excimer amplifier is a ring resonator.

19. An electronic device manufacturing method comprising:
generating an excimer laser beam with a laser system, the laser system including a solid-state laser device configured to output a laser beam, an excimer amplifier including a pair of discharge electrodes arranged to face each other with a discharge space therebetween, the laser beam passing through the discharge space, the excimer amplifier being configured to amplify the laser beam, a beam shaping unit arranged in an optical path between the solid-state laser device and the excimer amplifier, the beam shaping unit being configured to expand a beam section of the laser beam output from the solid-state laser device, a random phase plate arranged in an optical path between the beam shaping unit and the excimer amplifier, and a collimating optical system arranged in an optical path between the random phase plate and the excimer amplifier, when a traveling direction of the laser beam entering the excimer amplifier is a Z direction, a discharge direction of the discharge electrodes is a V direction, a direction orthogonal to the V direction and the Z direction is an H direction, a shaping direction of the beam shaping unit corresponding to the V direction in the beam section of the laser beam entering the excimer amplifier is a first direction, a shaping direction of the beam shaping unit corresponding to the H direction in the beam section is a second direction, an expansion rate in the first direction is E1, and an expansion rate in the second direction is E2, the beam shaping unit expanding the beam section of the laser beam such that an expansion ratio defined by E2/E1 is higher than 1;
outputting the excimer laser beam to an exposure apparatus; and
exposing a photosensitive substrate to the excimer laser beam within the exposure apparatus to manufacture an electronic device.

20. The laser system according to claim 1, wherein the collimating optical system is arranged at a position away from the random phase plate by a focal length of the collimating optical system.

* * * * *